Jan. 17, 1961  M. K. ERIKSEN  2,968,469
AUXILIARY SHOE UNIT FOR A CHUCK-TYPE TIRE SPREADER
Filed July 20, 1959  2 Sheets-Sheet 1
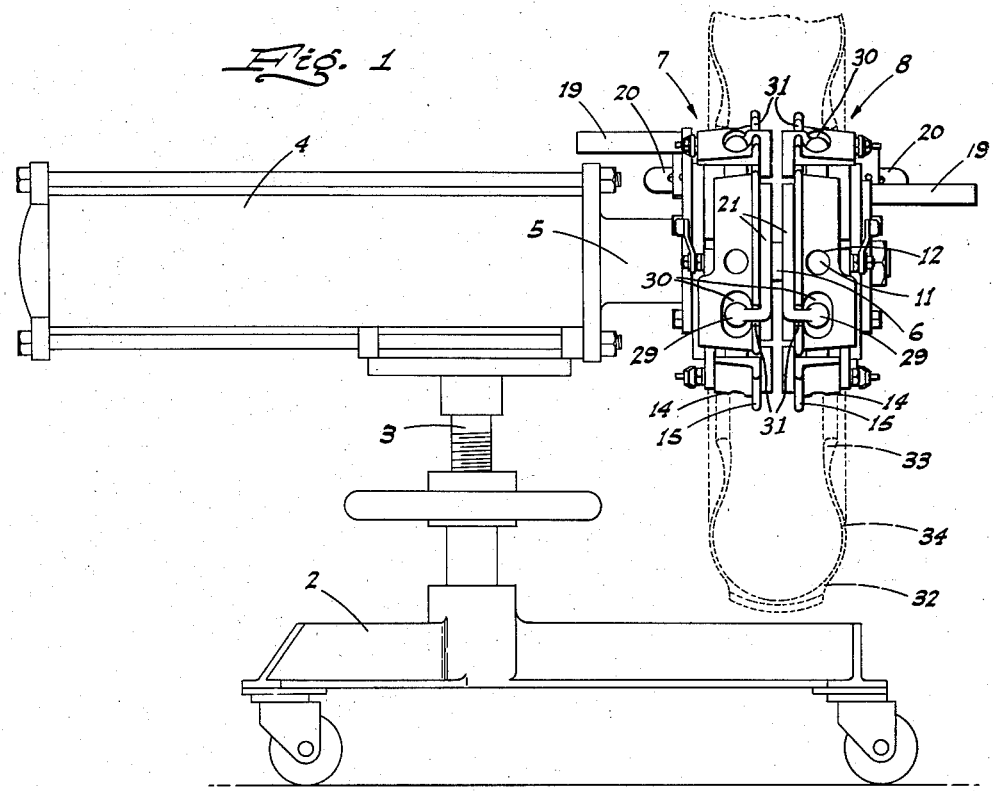
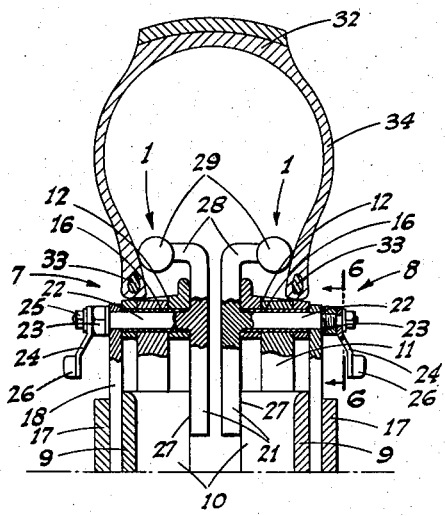
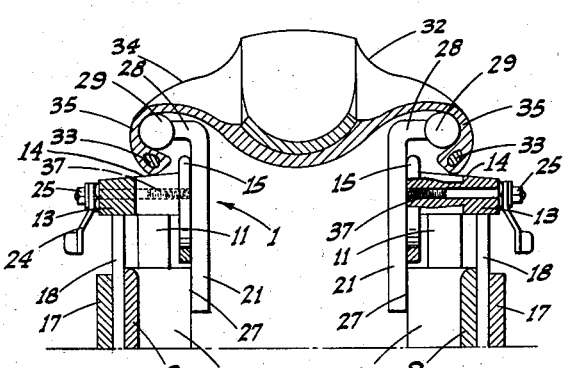
INVENTOR.
Merrill K. Eriksen
BY
Webster & Webster
ATTYS.

Jan. 17, 1961     M. K. ERIKSEN     2,968,469
AUXILIARY SHOE UNIT FOR A CHUCK-TYPE TIRE SPREADER
Filed July 20, 1959     2 Sheets-Sheet 2
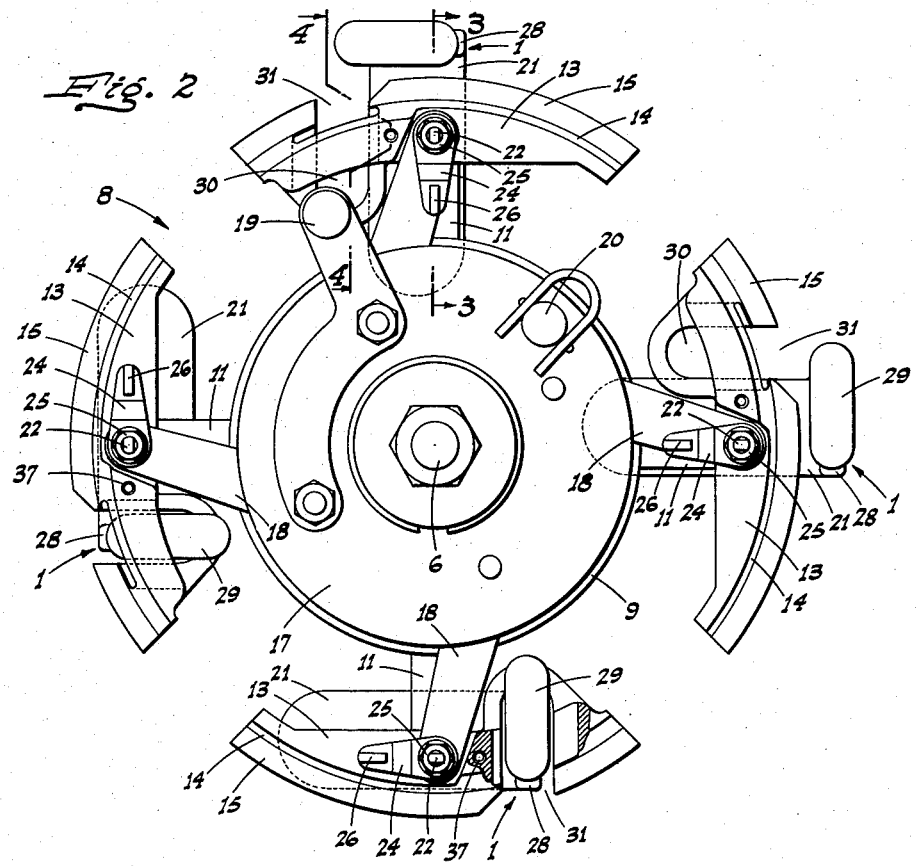
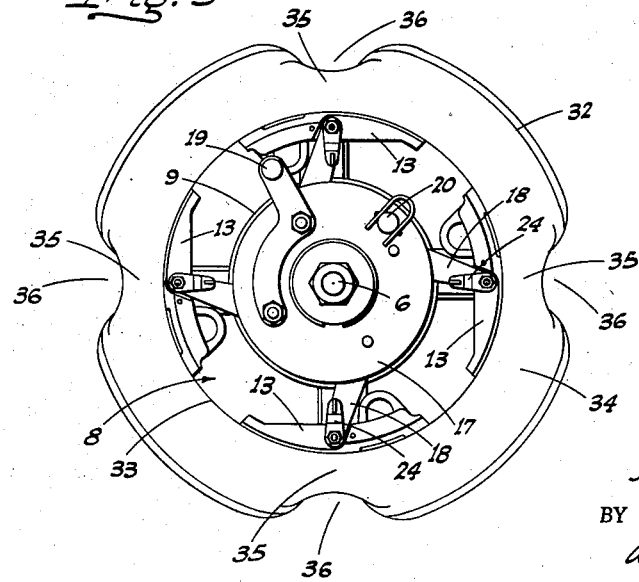
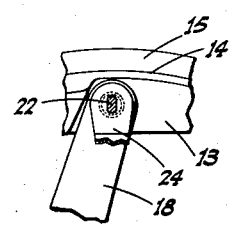
INVENTOR.
Merrill K. Eriksen
BY
Webster & Webster
ATTYS.

United States Patent Office 2,968,469
Patented Jan. 17, 1961

2,968,469

AUXILIARY SHOE UNIT FOR A CHUCK-TYPE TIRE SPREADER

Merrill K. Eriksen, Lodi, Calif., assignor to Super Mold Corporation of California, Lodi, Calif., a corporation of California Filed July 20, 1959, Ser. No. 828,390

9 Claims. (Cl. 254—50.3)

This invention relates in general to improvements in a tire spreader of the type which includes axially alined and separable, expandable, chuck units which are adapted—when expanded—to engage and support a tire, and—when axially separated—to spread the beads of the tire whereby to reduce its outside diameter and so that said tire can then be readily inserted in an endless or band-like retreading mold. A tire spreader, including chuck units as above, is shown for example in copending United States patent application, Serial No. 763,914, filed September 29, 1958, on Chuck Units for a Tire Spreader.

The individual chuck units of such a tire spreader include a plurality of circumferentially spaced segmental chuck jaws, each having an arcuate, tire bead receiving seat, and a back flange projecting radially out from the seat. When the chuck units are expanded in a tire and the tire beads rest on the seats of the segmental chuck jaws, the back flanges of the latter—upon axial separation of said chuck units—engage and spread apart the tire beads, which causes a reduction in the outside diameter of the tire, as aforesaid. This action is readily accomplished when the tire is of normal flexibility. However, with very stiff tires—such as wire-cord type—the reduction in outside diameter of the tire, by spreading the tire beads with the back flanges of the chuck jaws, is not sufficient to always permit the tire to be freely inserted in, or removed from, the retreading mold.

It is therefore the major object of this invention to provide the chuck jaws of a chuck-type tire spreader with auxiliary shoe units operative—essentially in lieu of such back flanges and upon axial separation of the chuck units—to pressingly engage against sidewall portions of the tire from interiorly thereof and at points near but radially outwardly of the tire beads. This results not only in the desired spreading apart of the tire beads, but also such sidewall portions are deformed or bulged laterally outwardly. This laterally outward deformation or bulging of the tire sidewall portions, together with spreading apart of the beads, causes the tire to buckle inwardly from the tread in the zone of the chuck jaws, with attendant reduction in the outside diameter of the tire sufficient for its free insertion in, or removal from, the retreading mold.

Another important object of this invention is to mount the auxiliary shoe units, on the related chuck jaws, for movement between a working position projecting radially outwardly from said chuck jaws for use with very stiff tires, and a non-working position wherein said shoe units are out of the way so that the chuck units may be used conventionally with a tire of normal flexibility. Also, the shoe units must be in such non-working position to permit a tire to be placed on, or removed from, the chuck units—when contracted—without obstruction.

An additional object of the invention is to provide auxiliary shoe units, for the purpose described, which are designed for simplicity and economy of manufacture, and installation on a chuck-type tire spreader without substantial modification of the latter.

It is also an object of the invention to provide practical, reliable, and durable auxiliary shoe units for a chuck-type tire spreader, and ones which will be exceedingly effective for the purpose for which they are designed.

These objects are accomplished by means of such structure and relative arrangement of parts as will fully appear by a perusal of the following specification and claims.

In the drawings:

Fig. 1 is a side elevation of a tire spreader fitted with the auxiliary shoe units; the chuck units being contracted and in adjacent or initial position, and the shoe units being in non-working position.

Fig. 2 is an enlarged outer end elevation of one of the chuck units expanded, with certain of the shoe units in working position and others in non-working position.

Fig. 3 is a fragmentary cross section on line 3—3 of Fig. 2, showing however both chuck units as expanded and supporting a tire, but before said chuck units are axially separated.

Fig. 4 is a similar view taken on line 4—4 of Fig. 2, but shows the chuck units as axially separated; the view illustrating the tire beads as spread apart, and the buckling of the tire in one zone by the adjacent shoe units.

Fig. 5 is a side elevation of a chuck-supported tire as buckled, at circumferentially spaced points and in the zone of the chuck jaws, by the shoe units.

Fig. 6 is a fragmentary cross section on line 6—6 of Fig. 3.

Referring now more particularly to the drawings and to the characters of reference marked thereon, the auxiliary shoe units, each of which is indicated at 1 and hereinafter described in detail, are mounted in connection with a chuck-type tire spreader which includes the following:

A mobile base 2 is fixed with an upstanding adjustable length spindle 3 which, at its upper end, is secured to and supports a horizontal, double acting power cylinder 4; such power cylinder being actuated and controlled through the medium of a conventional valve regulated, fluid pressure conduit system (not shown).

At one end thereof the power cylinder 4 includes a hub 5, and the piston rod 6 of such cylinder projects through and extends beyond such hub.

A pair of initially adjacent, back-to-back chuck units, indicated generally at 7 and 8, surround the projecting portion of the piston rod 6 in axial alinement; the chuck unit 7 being fixed to the hub 5, while the chuck unit 8 is fixed to the outer end portion of the piston rod 6. Thus, upon operation of the power cylinder 4 to advance the piston rod 6 the chuck units 7 and 8 are axially separated.

Such chuck units 7 and 8, while being back to back or facing in opposite directions, are of substantially identical construction, so that a description of one—and in general for the present purpose—will suffice for both.

Each such chuck unit comprises a circular body 9 provided on the back side with a plurality of circumferentially spaced, radial sockets 10 in which spokes 11 are slidable. The outer end portions of the spokes are engaged in a bore 12 formed in a related one of a plurality of such segmental chuck jaws 13 disposed in circumferentially spaced relation. Each such chuck jaw 13 has a radially outwardly facing, arcuate tire bead seat 14, and a radially outwardly projecting back flange 15; the corresponding spoke 11 being secured, at its outer end portion, in the bore 12 by a transverse tubular bushing 16.

The spokes 11 and the attached chuck jaws 13 are simultaneously moved outwardly to expand each chuck unit, or moved inwardly to contract the same, by means of a control disc 17 rotatably journaled in connection with, and in front of, the circular body 9; there being push-pull links 18 pivotally connected between said control disc 17 and the related chuck jaws 13. The control disc 17 is adapted to be manually rotated in one direction or the other, to expand or contract the chuck unit, respectively, by means of a radial handle 19 secured in connection with said control disc 17. The control disc 17 is held in any selected rotative position by a locking device shown in part at 20, and which locking device cooperates between the control disc 17 and the circular body 9.

It will thus be apparent that by operation of the power cylinder 4 the chuck units 7 and 8 can be axially separated or returned to their initial adjacent position, and that said chuck units can—by operation of the control discs 17—be expanded or contracted.

The tire spreader, as described above, embodies substantially the structure as shown in the aforementioned copending application. The auxiliary shoe units 1, which embody the present invention—and one of which units is provided for each chuck jaw 13—are each constructed and mounted as follows:

Each such shoe unit 1 comprises an arm 21 disposed at the back of the related chuck jaw 13; such arm being formed—intermediate its ends, and in integral relation—with a right angle spindle 22 which turnably projects through the adjacent tubular bushing 16, whereby said arm 21 is swingable about an axis parallel to that of the chuck unit. The spindle 22 projects beyond the outer end of the tubular bushing 16 and there not only provides the pivot for the corresponding link 18, which is retained by a nut 23, but also carries a radial lever arm 24 retained by a nut 25. The spindle 22 at the point of passage through the lever arm 24 is non-circular, as shown in Fig. 6, whereby said lever arm 24 is non-rotatable on such spindle. The lever arm 24 is provided at its outer end with a finger tab 26.

The arm 21 bears at all times against the back side of the chuck jaw 13, and when the shoe unit 1 is in working position such arm 21 extends radially of the axis of the chuck unit; the inner end portion of said arm 21 then lying in abutment, as at 27, against the back side of the adjacent radial socket 10.

At its other or outer end portion the arm 21 is bent laterally to define an out-turned finger 28 which spans the adjacent flange 15 and overhangs the tire bead seat 14. At its free end the out-turned finger 28 merges in rigid relation with an elongated shoe 29 which extends lengthwise of the chuck jaw 13. Thus, in the working position of the shoe unit 1 the elongated shoe 29 is disposed—in clearance relation—ahead of the back flange 15 and radially outwardly of said bead seat 14.

In addition to the working position of each shoe unit 1, as above described, such unit has a non-working position in which it does not project from the chuck jaw 13. More particularly, by manipulation of the lever arm 24 so as to cause limited rotation of the spindle 22 in a predetermined direction, the arm 21 is swung about its axis and until the elongated shoe 29 enters a recess 30 formed in the chuck jaw 13 and opening through the bead seat 14. The back flange 15 is notched, as at 31, for reception of the out-turned finger 28 when the shoe 29 occupies a position in the recess 30. See the bottom and left hand shoe units 1 in Fig. 2, wherein such units are in the above described non-working position, and so that they have no projection from the related chuck jaw 13.

In use of the tire spreader, fitted with the auxiliary shoe units 1, the chuck units 7 and 8 are initially in adjacent relation and contracted, with said shoe units 1 in non-working position—all as illustrated in Fig. 1. Nextly, a tire 32 is placed over and supported on the chuck units 7 and 8, as shown in dotted lines in Fig. 1. Thereafter, said chuck units 7 and 8 are expanded—by manipulation of the handles 19 and rotation of the control discs 17—until the tire beads 33 firmly engage about their circumference on the seats 14 of the chuck jaws 13, and with the back flanges 15 inwardly of said tire beads 33; the shoe units 1 then being swung from non-working position to outwardly projecting working position by suitable manipulation of the lever arms 24. In such working position the chuck units 1 are disposed with the outturned fingers 28 and shoes 29 inside the tire 32. See Fig. 3.

Nextly, the chuck units 7 and 8 are axially separated by operation of the power cylinder 4, and when this occurs the shoes 29 pressingly engage against the sidewalls 34—from within the tire, and adjacent but radially out from the beads 33—whereby to laterally outwardly deform or bulge such sidewalls, as at 35, while simultaneously spreading apart said tire beads. Such laterally outward deformation or bulging 35 of the sidewalls 34, together with the spreading apart of the tire beads 33, causes the tire 32 to buckle inwardly from the tread, as at 36, in the zone of each back-to-back pair of the shoe units 1. See Fig. 5. With such inward buckling of the tire at circumferentially spaced points, as at 36, the outside diameter of the tire is reduced to a greater extent than otherwise and sufficient for free insertion of said tire into, or removal from, the retreading mold by the tire spreader.

To remove a tire from the tire spreader the hereinbefore described steps are merely reversed, to the end that the chuck units 7 and 8 are returned to starting position, as shown in Fig. 1, and wherein the shoe units 1 are in their non-working position. The tire 32 can then be readily lifted slightly and slipped off of the chuck units 7 and 8 without obstruction by the shoe units 1.

A spring-loaded detent 37 on each chuck jaw 13 cooperates with the corresponding arm 21 to releasably hold the latter against swinging movement when the shoe unit 1 is in working position.

From the foregoing description it will be readily seen that there has been produced such auxiliary shoe unit for a chuck-type tire spreader as will substantially fulfill the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention the following is claimed as new and useful, and upon which Letters Patent are desired:

1. In a tire spreader which includes axially alined and separable, expandable, tire supporting chucks individually embodying a plurality of circumferentially spaced segmental chuck jaws, each thereof having a tire bead seat; auxiliary shoe units, for related chuck jaws, each comprising a shoe adapted for pressing engagement against a sidewall portion of the tire from interiorly of the latter, and means between the chuck jaw and the shoe mounting the latter for movement between a working position spaced radially outwardly of said seat and a non-working position radially inwardly of the seat.

2. In a tire spreader which includes axially alined and separable, expandable, tire supporting chucks individually embodying a plurality of circumferentially spaced segmental chuck jaws, each thereof having a tire bead seat; auxiliary shoe units, for related chuck jaws, each comprising a shoe adapted for pressing engagement against a sidewall portion of the tire from interiorly of the latter, and an arm extending between the back of the chuck jaw and the shoe mounting the latter in a working position spaced radially outwardly of said seat intermediate the ends thereof; said arm being pivoted on the chuck jaw for swinging motion in a direction to dispose the shoe in a non-working position inwardly of said seat; the latter being recessed for reception of the shoe in said non-working position.

3. A structure, as in claim 2, including means between the chuck jaw and arm to yieldably maintain the latter disposed with the shoe in working position.

4. In a tire spreader which includes axially alined and separable, expandable, tire supporting chucks individually embodying a plurality of circumferentially spaced segmental chuck jaws, each thereof having a tire bead seat and a back flange projecting outwardly from said seat; auxiliary shoe units, for related chuck jaws, each comprising a shoe adapted for pressing engagement against a sidewall portion of the tire from interiorly of the latter, an arm mounted in connection with the chuck jaw at the back thereof and intermediate its ends, the arm projecting radially outwardly beyond the back flange, and a laterally out-turned finger on the arm overhanging the back flange and seat, and the shoe being fixed on the free end of the finger whereby to dispose said shoe in a working position laterally out from the back flange and radially outwardly of said seat; said arm being pivoted on the chuck jaw for swinging motion about an axis extending transversely of said chuck jaw whereby to then dispose the shoe in a non-working position inwardly of said seat; the latter being recessed for reception of the shoe in said non-working position, and the back flange being notched to permit passage of the finger as the shoe enters said recess.

5. In a tire spreader which includes axially alined and separable, expandable, tire supporting chucks individually embodying a plurality of circumferentially spaced segmental chuck jaws, each thereof having a tire bead seat and a back flange projecting outwardly from said seat; auxiliary shoe units, for related chuck jaws, each comprising a shoe adapted for pressing engagement against a sidewall portion of the tire from interiorly of the latter, an arm at the back of the chuck jaw, a transverse spindle rigid with the arm and journaled in the chuck jaw, the arm being swingable between one position projecting radially of the chuck jaw to an outer end termination beyond the back flange, and another position extending generally lengthwise of said chuck jaw; a laterally out-turned finger on the outer end of the arm, and the shoe being fixed on the free end of said finger whereby said shoe is spaced ahead of the back flange and radially outwardly of the seat when the arm is in said one position, and said shoe is swung inwardly when the arm is in said other position; the seat being recessed for reception of the shoe when inswung and the back flange being notched for passage of said finger as the shoe enters said recess.

6. In a tire spreader which includes axially alined and separable, expandable, tire supporting chucks individually embodying a plurality of circumferentially spaced segmental chuck jaws, each thereof having a tire bead seat and a back flange projecting outwardly from said seat; auxiliary shoe units, for related chuck jaws, each comprising a shoe adapted for pressing engagement against a sidewall portion of the tire from interiorly of the latter, the shoe having a working position spaced ahead of the back flange and radially outwardly of said seat, and means between the back of the chuck jaw and shoe mounting the latter for movement between said working position and a non-working position wherein said back flange and seat are radially outwardly unobstructed.

7. A structure, as in claim 6, in which said mounting means includes an arm at the back of said chuck jaw, a transverse spindle on the arm journaled in the chuck jaw and projecting from the front thereof, and a radial lever arm on the projecting end of said spindle adapted for hand manipulation.

8. In a tire spreader which includes axially alined and separable, expandable, tire supporting chucks individually embodying a plurality of circumferentially spaced segmental chuck jaws, each thereof having a tire bead seat, and a back flange projecting outwardly from said seat; auxiliary shoe units, for related chuck jaws, each comprising a shoe adapted for pressing engagement against a sidewall portion of the tire from interiorly of the latter, the shoes being disposed in planes laterally out from the back flanges, and means mounting each shoe on the related jaw for movement between a position radially out from the tire bead seat and a position radially inward of said seat.

9. A tire spreader comprising tire supporting units mounted for separating movement laterally of such tire and including bead engaging members, a plurality of shoes to engage the sidewalls of the tire interiorly thereof at circumferentially spaced points, and means mounting the shoes on the members for movement between a working position radially out from the bead engaging members and a non-working position radially in from such members.

References Cited in the file of this patent

UNITED STATES PATENTS 2,919,892     Hawkinson _____ Jan. 5, 1960